Patented Dec. 7, 1937

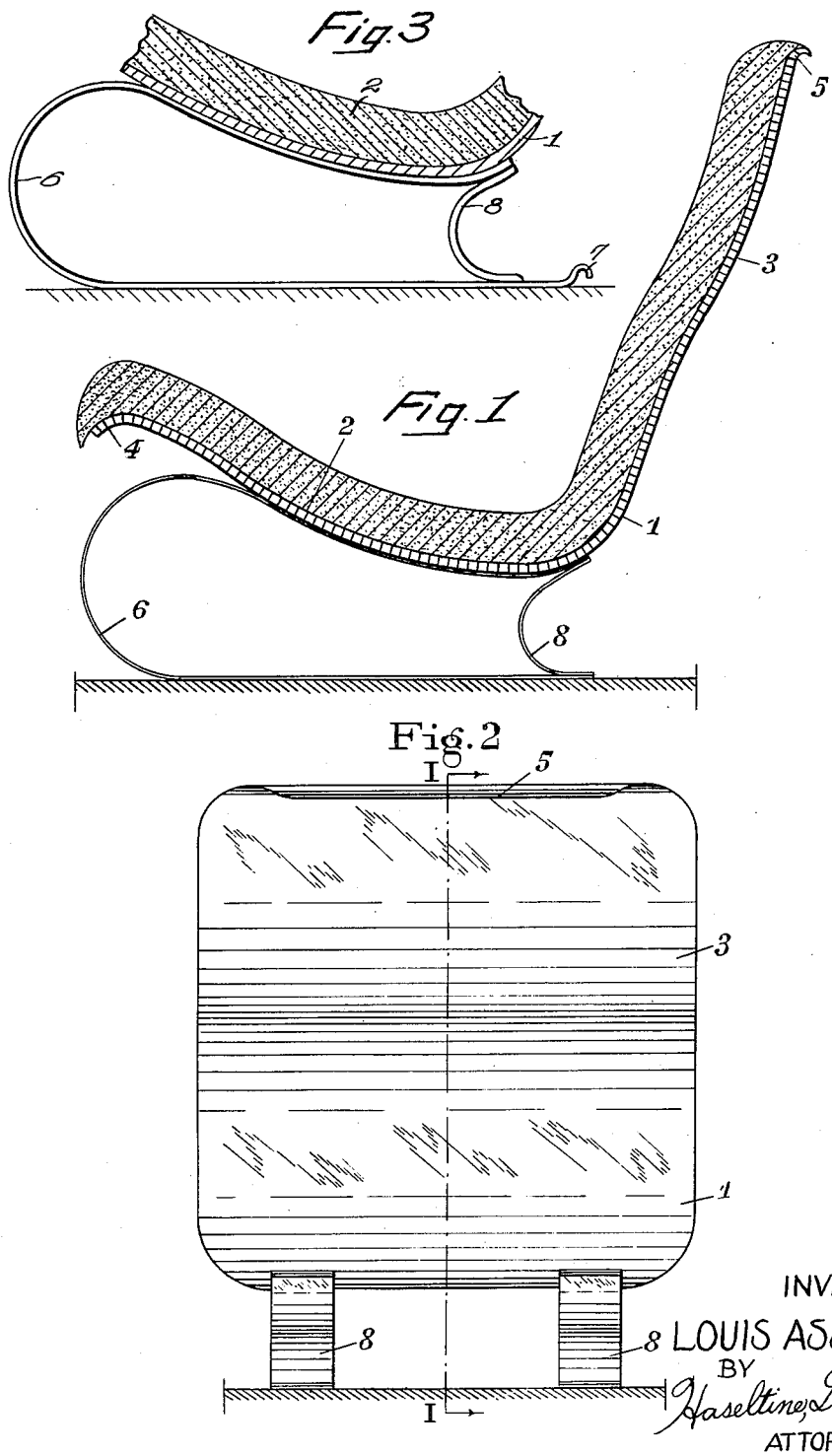

2,101,422

UNITED STATES PATENT OFFICE 2,101,422

FLEXIBLE SEAT SUPPORT

Louis Assalit, Marseille, France

Application January 31, 1935, Serial No. 4,246
In France February 14, 1934

3 Claims. (Cl. 155—54)

All users of automobile vehicles travelling on a surface which is in a bad state are acquainted with the many inconveniences resulting therefrom, such as sudden movements, jolts and other unexpected displacements reacting on the seats of the vehicle.

These multiple displacements, which are seldom of the same amplitude, cause the occupant, by reason of a natural reflex action owing to the present design of the seats, to endeavour to attenuate these displacements by means of muscular contractions.

These repeated contractions during a journey, even of average duration, may sometimes lead to disturbances of the organism and always produce fatigue.

Such displacements also produce friction between the bearing surfaces and the supported surfaces, which leads, on the one hand, to wear of the clothes and, on the other hand, to wear of the covering of the seats.

It has been sought to obviate these chief drawbacks by the provision of multiple suspension devices for the seats having movable fittings, springs and shock absorbers, but these expensive and sometimes complicated arrangements have not yielded the practical result aimed at owing to the independence of the seat proper and of its back.

The yielding of the seating portion under a sudden movement is not always followed by the back reciprocally and in the same direction. These sudden deformations constitute the cause of the drawbacks hereinbefore referred to, which are now obviated by the subject of the present invention, which consists in a rigid seat having flexible supports.

The object of the invention is to produce, first of all by extremely simple means, a suspended seat suitable for use in all vehicles and conveyances and permitting of freeing the traveller, to a maximum degree, from the disagreeable effects of jolts and thereby avoiding muscular contraction and fatigue as well as the deformation and wear of his clothes on account of repeated friction thereof with the seat and the back.

This seat is substantially characterized, first by its back and its seating portion being formed by rigid and flexible surfaces not capable of extension and mounted on a rigid frame, these rigid surfaces being so fashioned that they cannot be subjected to any independent oscillating deformation affecting the occupant and mounted in a manner suitable for each application; the surfaces may or may not, according to their nature, be covered with any novel or known upholstery merely intended to ensure softness and not suspension.

This seat is further characterized by the securing of the above-mentioned integral combination comprising the seating portion and the back, on another combination of suspension and shock-absorbing means, preferably constituted by springs of suitable form connected at one or more judiciously selected points to obtain the maximum absorption of the movements of the vehicle transmitted on to the seat.

The rigid seat having flexible supports is illustrated in a somewhat diagrammatical manner by way of example in the accompanying drawing, but this drawing may also serve as a constructional example of one of the forms of the subject of the invention.

In this drawing:

Figure 1 shows the combination of the parts forming the seat seen from the side and in longitudinal section along the line I—I of Figure 2, and Figure 2 shows this same seat seen from the rear.

Figure 3 is a fragmentary view showing a partial modification.

The seat essentially comprises a pressed metal sheet 1 forming both the seating portion 2 and the back 3, the thickness of this metal sheet being sufficient to prevent any deformation. The said metal sheet 1 is terminated, at the front of the seating portion 2, by a rounded-off portion 4 to enable it to follow the internal angle of the leg when it is bent, and at the top of the back 3 by a hooked portion formed merely by bending of the metal sheet 1, which may also serve for retaining purposes and for gripping by the hand.

The seat thus formed is fixed on a support 6 comprising a metal sheet or steel bands or rods whose curvature approaches the form of a U having unequal limbs, the upper of which is secured to the seat by known means, such as autogenous welding, rivets, bolts or the like, while the lower limb preventing the seat from rocking rests on the chassis and serves to secure it. In the event of this seat being utilized otherwise than for vehicles and other conveyances, the lower limb rests on the ground or on the feet, as in the case of interior seats or garden seats as well as for other numerous purposes. This lower limb may be terminated by a raised portion 7 (shown in the fragmentary Figure 3) in order to form or support a foot-rest for the seat placed behind it.

The shock-absorbing member of the seat preferably comprises a second supporting metal sheet, band or rod 8 of steel also in the form of a U interposed and fixed between the limbs of the support 6. This flexible support has a flexing period which is calculated to be asynchronous with respect to that of the preceding spring 6 in order to obtain the desired damping. In other words, it is intended that the rates of vibration of these springs will react upon and neutralize each other, the amplitude of spring 6 being greater than that of spring 8 by its rate being obviously far slower than that of the rear spring, but both have their loops directed forward and thus cooperate to dampen vibrations of the seat. In fact, spring 8 is intended to serve as a damper for spring 6.

The metal sheet 1 will be covered by upholstery preferably of rubber sponge secured to it by adhesive medium. This rubber sponge will have a smooth portion on its external face in order to avoid the effects of capillary action should it become wet. However, any other upholstery or covering may be used. The section of thickness will be designed to ensure the comfort of the occupant.

When constituted in this manner, the functioning of the seat will be easily understood. Since it is rigid, it follows that the inertia of the mass of the occupant subjected to the vertical and horizontal movements of the vehicle will obviate the sinking of the seating portion 2 and of the occupant with respect to the back 3, and inversely of the back 3 with respect to the seating portion 2. By reason of this fact, the friction between the occupant, the seating portion 2 and the back 3 will be prevented, as well as the wear of the parts subjected to the friction.

The occupant is entirely supported by the rigid seat, so that he no longer has to contract his muscles in order to avoid contact with the back, and the fatigue due to this contraction is thus avoided, because all vertical or horizontal movements of the occupant and of the seat are essentially simultaneous or combined and the occupant is thus prevented from absorbing them, the shocks being absorbed by the damped suspension combination 6 and 8 which, owing to the suitable form of the springs, considerably absorbs all the displacements.

There is thus attained by this seat combining the seating portions and the back and supported by a flexible mounting, an advance in the art as well as a novel result as compared with similar seats. However, its combination, forms and dimensions are not limitative, but may vary without departing from the general principle of the invention hereinbefore described. Thus, the suspension and damping by means of flexion and torsional springs may be replaced by other equivalent means while retaining the principles of the invention.

It is, of course, evident from the foregoing description that the principles disclosed may be applied to analogous structures such as benches and other types of chairs in which they can be incorporated.

In other words, variations may be resorted to and features and parts may be used without others within the scope of the appended claims.

What I claim and desire to secure by Letters Patent of the United States is:—

1. A seat structure comprising the combination of a rigid seat unit and a damped spring suspension supporting said seat unit and when the seat unit is occupied effectively damping oscillations due to movements of an occupant or vibrations of a vehicle upon which the seat structure may be mounted, said seat unit including a seat portion and a back portion fixedly secured together to form a rigid unalterable unit having inflexible bearing surfaces, and said damped spring suspension including a relatively large forwardly looped or U-shaped spring of flat strip steel having two unequal limbs, with the longer limb resting on the floor and directed rearwardly and the other shorter limb attached directly to the seat portion, and a relatively smaller forwardly looped or U-shaped spring of flat strip steel having the ends thereof secured to the inside portions of the ends of the large spring so as to be located substantially within the outline of said large spring, and both springs together forming a damped spring unit and having relatively unequal and non-harmonic rates of vibration which are effective to mutually dampen each other when the seat structure is occupied within practical limits for varying weights of occupants.

2. A seat structure comprising the combination of a rigid seat unit and a damped spring suspension supporting said seat unit and when the seat unit is occupied effectively damping oscillations due to movements of an occupant or vibrations of a vehicle upon which the seat structure may be mounted, said seat unit including a seat portion and a back portion fixedly secured together to form a rigid unalterable unit having inflexible bearing surfaces, and said spring suspension including a spaced pair of relatively larger parallel and forwardly looped or U-shaped springs of flat strip steel, each having one limb resting on the floor and directed rearwardly and the other limb of each being attached directly to the seat portion adjacent to the sides thereof, and a spaced pair of relatively smaller parallel and forwardly looped or U-shaped springs of flat strip steel each having the ends thereof secured and connected within and to the inside portions of the two ends of one of the larger springs so as to be located substantially within the outline of the respective larger spring, and both springs in each pair of springs formed by a larger and a smaller spring having relatively unequal and non-harmonic rates of vibration which are effective to mutually dampen each other when the seat structure is occupied within practical limits for varying weights of occupants.

3. A seat structure comprising the combination of a rigid seat unit and a damped spring suspension supporting said seat unit and when the seat unit is occupied effectively damping oscillations due to movements of an occupant or vibrations of a vehicle upon which the seat structure may be mounted, said seat unit including a seat portion and back portion fixedly secured together to form a rigid unalterable unit having inflexible bearing surfaces, and said spring suspension including a spaced pair of relatively large parallel and forwardly looped or U-shaped springs of flat strip steel, each having one limb resting on the floor and directed rearwardly and the other limb of each being attached directly to the seat portion adjacent to the sides thereof, and a spaced pair of relatively small parallel and forwardly looped or U-shaped springs of flat strip steel each having the ends thereof secured to the two ends of one of the large springs so as to be located substantially within the same vertical plane as the respective large spring, and both springs in each pair of springs formed by a large and a small spring having relatively unequal and non-harmonic rates of vibration which are effective to mutually dampen each other when the seat structure is occupied within practical limits for varying weights of occupants.

LOUIS ASSALIT.